US011287365B2

(12) United States Patent
Clive-Smith et al.

(10) Patent No.: US 11,287,365 B2
(45) Date of Patent: Mar. 29, 2022

(54) CUVETTE

(71) Applicant: Entia Limited, London Greater London (GB)

(72) Inventors: Millie Clive-Smith, London Greater London (GB); Toby Basey-Fisher, London Greater London (GB)

(73) Assignee: Entia Limited, London (GB)

( * ) Notice: Subject to any disclaimer, the term of this patent is extended or adjusted under 35 U.S.C. 154(b) by 234 days.

(21) Appl. No.: 16/343,947

(22) PCT Filed: Oct. 9, 2017

(86) PCT No.: PCT/GB2017/053048
§ 371 (c)(1),
(2) Date: Apr. 22, 2019

(87) PCT Pub. No.: WO2018/078324
PCT Pub. Date: May 3, 2018

(65) Prior Publication Data
US 2020/0209145 A1    Jul. 2, 2020

(30) Foreign Application Priority Data
Oct. 24, 2016  (GB) ..................................... 1617940

(51) Int. Cl.
*G01N 21/07* (2006.01)
*B01L 3/00* (2006.01)
(Continued)

(52) U.S. Cl.
CPC ............ *G01N 21/07* (2013.01); *B01L 3/5021* (2013.01); *B01L 3/5027* (2013.01); *G01N 21/11* (2013.01);
(Continued)

(58) Field of Classification Search
CPC ................... G01N 21/07; G01N 21/11; G01N 2021/0382; G01N 21/03; B01L 3/5021;
(Continued)

(56) References Cited

U.S. PATENT DOCUMENTS 5,286,454 A      2/1994  Nilsson et al.
2004/0166551 A1*  8/2004  Moulds ................ G01N 33/491
                                              435/13

(Continued)

FOREIGN PATENT DOCUMENTS

| EP | 2096444 A1 | 2/2009 |
|----|------------|--------|
| WO | 99036765 A1 | 7/1999 |
| WO | 07008137 A1 | 6/2006 |

OTHER PUBLICATIONS

International Search Report and Written Opinion for Application No. PCT/GB2017/053048 dated Dec. 22, 2017 (13 pages).

*Primary Examiner* — Jill A Warden
*Assistant Examiner* — John McGuirk
(74) *Attorney, Agent, or Firm* — Michael Best & Friedrich LLP

(57) ABSTRACT

A cuvette comprising: a main body having a sample chamber formed therein, the sample chamber communicating with the exterior of the cuvette by an opening formed in the exterior of the main body, wherein the sample chamber comprises a first sample chamber and a second sample chamber, the first sample chamber being in fluid communication with the opening, and the second sample chamber having a first end which is in fluid communication with the first sample chamber, and a second, closed end, the second sample chamber being in fluid communication with the exterior of the cuvette only through the first chamber, the first chamber having a width which is greater than that of the second chamber, and further wherein the greatest width of the opening is greater than or equal to the greatest width of (Continued)

the first sample chamber, the greatest width of the first sample chamber is greater than or equal to the greatest width of the second sample chamber, and the width of the sample chamber, passing from the opening to the closed end of the second chamber, either remains constant or decreases at each point along its length.

16 Claims, 4 Drawing Sheets

(51) Int. Cl.
    *G01N 21/11* (2006.01)
    *G01N 21/03* (2006.01)

(52) U.S. Cl.
    CPC . *B01L 2200/0642* (2013.01); *B01L 2300/087* (2013.01); *B01L 2400/0406* (2013.01); *B01L 2400/0409* (2013.01); *G01N 2021/0382* (2013.01)

(58) Field of Classification Search
    CPC ........... B01L 3/5027; B01L 2200/0642; B01L 2300/087; B01L 2400/0406; B01L 2400/0409; B01L 3/50
    See application file for complete search history.

(56) References Cited

U.S. PATENT DOCUMENTS

| | | |
|---|---|---|
| 2010/0238436 A1 | 9/2010 | Havard |
| 2010/0307595 A1* | 12/2010 | Mark .................. B01L 3/50273 137/1 |
| 2010/0317094 A1 | 12/2010 | Ricco et al. |
| 2011/0111425 A1* | 5/2011 | Rylatt .............. G01N 33/54393 435/7.1 |
| 2012/0015444 A1 | 1/2012 | Mazumdar et al. |
| 2016/0022189 A1* | 1/2016 | Pouteau ........... A61B 5/150022 600/583 |

* cited by examiner

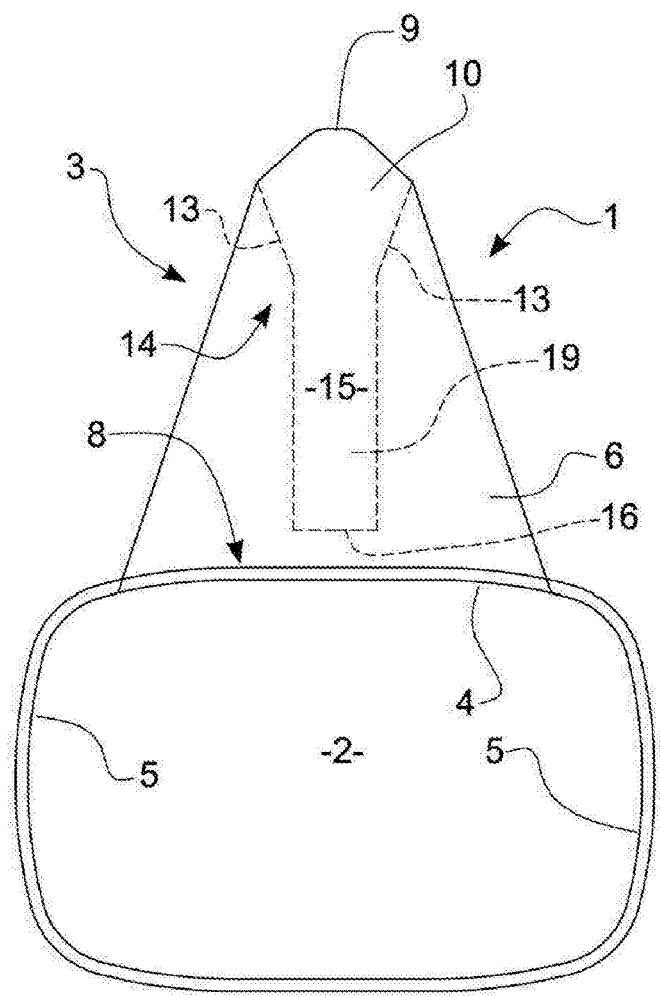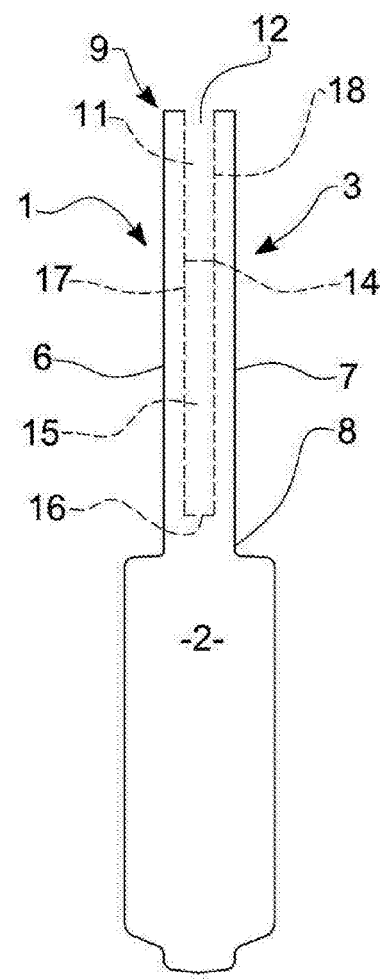
FIG 1  FIG 2
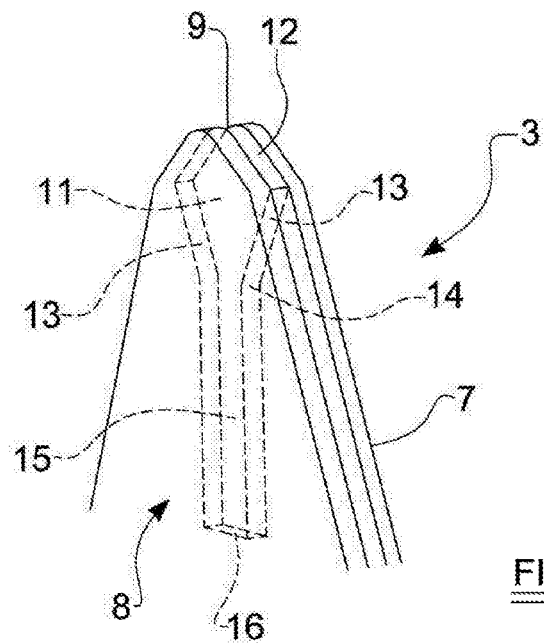
FIG 3

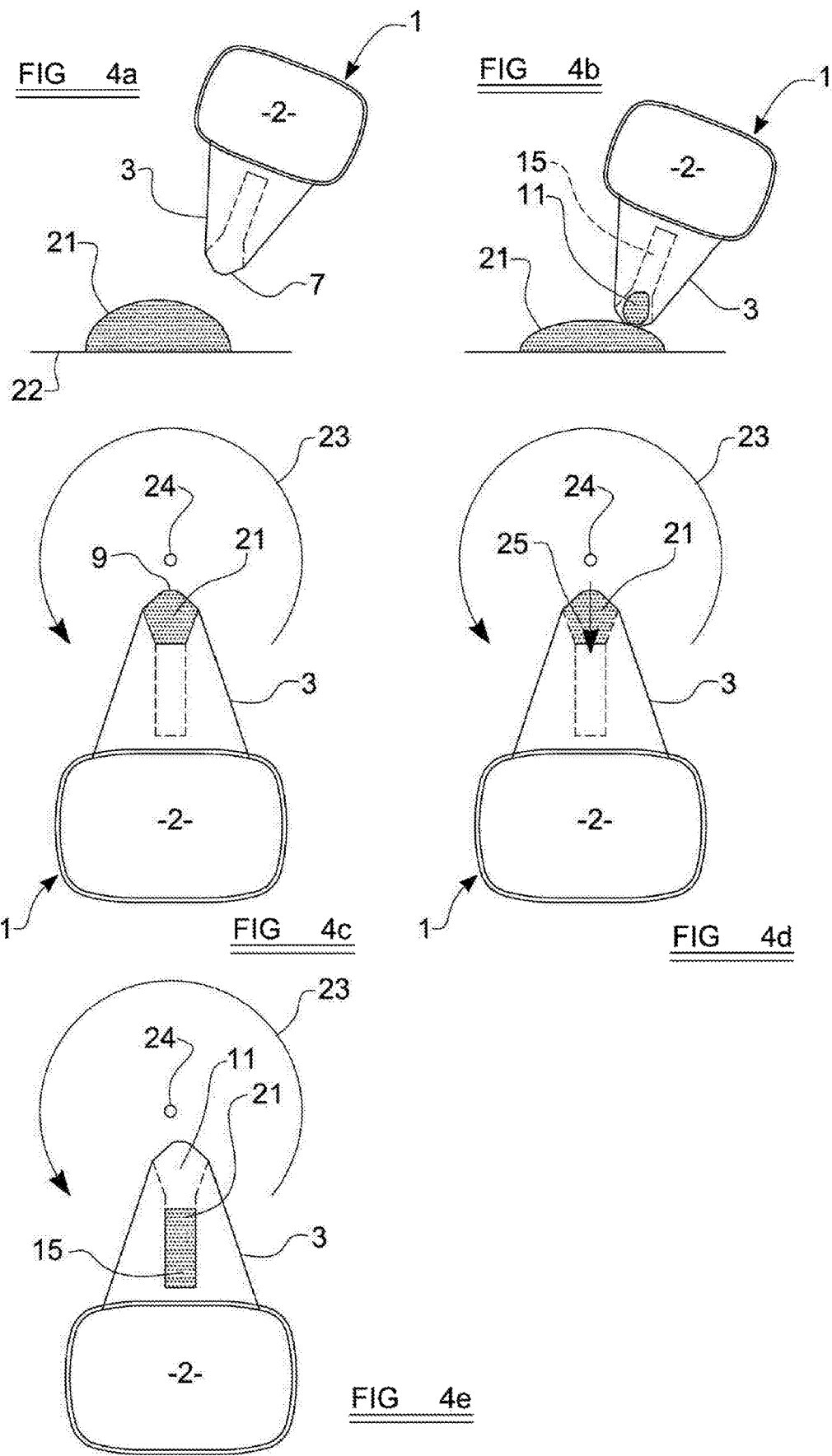

CUVETTE

CROSS-REFERENCE TO RELATED APPLICATION DATA

This application is a U.S. national phase entry of International Application No. PCT/GB2017/053048, filed Oct. 9, 2017, which claims priority to GB Patent Application No. 1617940.0, filed Oct. 24, 2016, the entire contents all of which are incorporated herein by reference in their entirety.

THE PRESENT invention relates to a cuvette, and in particular concerns a cuvette for analysis of a fluid sample under centrifugation.

Analysis devices are known that determine an optical property of a fluid contained within a cuvette. In such devices, the cuvette is at least partially filled with a fluid sample for analysis, and placed into the device. Optical (or other) radiation is passed through the fluid, to allow properties of the fluid sample to be measured.

Examples of known types of cuvette can be seen in, for example, EP2096444A1, EP1055112A1 and WO2007/008137.

SUMMARY OF THE INVENTION

Optical analysis of blood and other fluid samples is utilised for a wide range of medical diagnostics, including the diagnosis of anaemia. For example, an optical analysis device can analyse a blood sample to determine haematocrit and the presence and quantity of haemoglobin.

A cuvette is a disposable part of the system, with a new cuvette required for each measurement. It is important that a user can load a sample into the cuvette quickly and easily. It is also important that the cuvette can be manufactured at a low cost, can be easily loaded and secured on the holder of the optical analysis device, and can be readily removed from the holder once the analysis has taken place for its disposal.

Moreover, it is important that the cuvette can provide a fluid sample that is effectively free of air bubbles during analysis to improve the accuracy of the optical analysis. The presence of air bubbles in the fluid sample can reduce the quality of the optical analysis results. Furthermore, it is important that the cuvette is filled with the maximum possible sample volume to improve the accuracy of the measurement.

It is an object of the present invention to provide an improved cuvette of this type.

Accordingly, one aspect of this invention provides a cuvette comprising: a main body having a sample chamber formed therein, the sample chamber communicating with the exterior of the cuvette by an opening formed in the exterior of the main body, wherein the sample chamber comprises a first sample chamber and a second sample chamber, the first sample chamber being in fluid communication with the opening, and the second sample chamber having a first end which is in fluid communication with the first sample chamber, and a second, closed end, the second sample chamber being in fluid communication with the exterior of the cuvette only through the first chamber, the first chamber having a width which is greater than that of the second chamber, and further wherein the greatest width of the opening is greater than or equal to the greatest width of the first sample chamber, the greatest width of the first sample chamber is greater than or equal to the greatest width of the second sample chamber, and the width of the sample chamber, passing from the opening to the closed end of the second chamber, either remains constant or decreases at each point along its length.

Advantageously, the volume of the second chamber is greater than or equal to the volume of the first chamber.

Preferably, the volume of the first chamber is between 75 and 95% of the volume of the second chamber.

Conveniently, the volume of the first chamber is around 90% of the volume of the second chamber.

Advantageously, the volume of the second chamber is less than or equal to the volume of the first chamber.

Preferably, the volume of the second chamber is less than 90% of the volume of the first chamber.

Conveniently, the volume of the second chamber is less than 70% of the volume of the first chamber.

Advantageously, the width of the first chamber tapers from the opening toward a junction between the first chamber and the second chamber.

Preferably, the width of the second sample chamber is substantially constant, along its length.

Conveniently, the depth of the sample chamber is substantially constant over its area.

Advantageously, the closed end of the second chamber is substantially flat.

Preferably, the closed end of the second chamber is curved in shape.

Conveniently, the cuvette further comprises a grip portion which, in use, is adapted to be gripped by a user.

Advantageously, the sample chamber is formed within a sample portion which is attached to, or formed integrally with, the grip portion to form the main body of the cuvette.

Preferably, the opening is formed at an apex of the sample portion, and extends around at least a part of the apex so that the sample portion forms a pair of protruding, spaced-apart lips on either side of the opening.

Another aspect of the present invention provides a method of analysing a fluid, comprising the steps of: providing a cuvette according to any of the above; touching an opening of the cuvette on the fluid, so that the fluid is drawn into the sample chamber; placing the cuvette in a centrifuge having an axis of rotation about which the cuvette rotates, the cuvette being placed in the centrifuge so that the first sample chamber is closer to the access of rotation than the second sample chamber; rotating the cuvette within the centrifuge so that a force is exerted on the fluid sample in a direction away from the axis of rotation, causing the fluid sample to move from the first sample chamber to the second sample chamber; and analysing at least one property of the fluid when the fluid is in the second sample chamber.

Conveniently, when the fluid is drawn into the first sample chamber, the fluid is not also drawn into the second sample chamber.

Advantageously, the fluid is drawn into the first sample chamber through capillary action.

Preferably, the step of analysing the fluid within the second sample chamber comprises providing at least one source of radiation on one side of the cuvette, and at least one radiation sensor on the other side of the cuvette, and analysing the extent to which the radiation emitted by the at least one radiation source is transmitted through the fluid held in the second chamber.

Conveniently, the step of analysing the fluid within the second sample chamber comprises providing at least one source of radiation on one side of the cuvette, and at least one radiation sensor on the same side of the cuvette, and analysing the extent to which the radiation emitted by the at least one radiation source is reflected by the fluid held in the second chamber.

BRIEF DESCRIPTION OF THE DRAWINGS

In order that the present invention may be more readily understood embodiments will therefore now be described, by way of example, with reference to the accompanying drawings, in which:

FIGS. 1 to 3 and 5a show a cuvette embodying the present invention;

FIGS. 4a to 4e show stages in the use of the cuvette of FIGS. 1 to 3 and 5a.

DETAILED DESCRIPTION

Figure 5A:
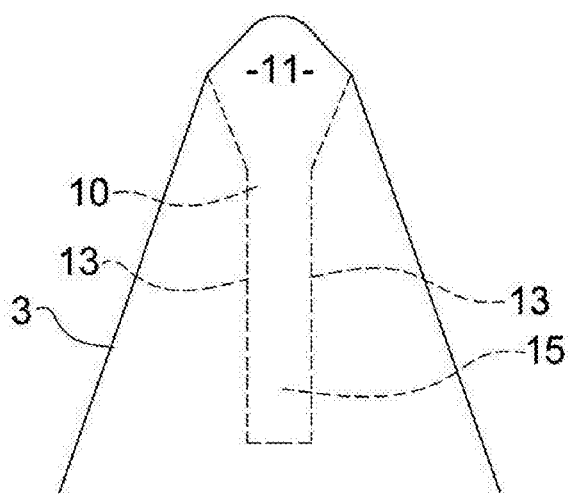

FIGS. 1 and 2 show views of a cuvette 1 embodying the present invention. The cuvette 1 comprises a grip portion 2 which, in use, will be grasped by a user. The cuvette 1 also includes a sample portion 3 which is attached to, or formed integrally with, the grip portion 2. FIG. 3 shows an enlarged perspective view of the sample portion 3.

In the example shown, the grip portion 2 is generally planar. In this embodiment, the grip portion 2 has the approximate shape of a rectangle with rounded corners. The grip portion 2 is preferably of an appropriate size that it may be gripped between the thumb and forefinger of a user. The grip portion 2 may, for example be around 1 cm in length and around 1.5 cm in width, although the grip portion 2 may have any other suitable dimensions.

In the example shown the sample portion 3 protrudes from a first side 4 of the grip portion 2. As shown in FIGS. 1 and 2, the first side 4 may be one of the long sides of the rectangular shape of the grip portion 2.

In preferred embodiments, the grip portion 2 may have a raised edge wall extending around the first side 4 thereof, and optionally also all or part of the two adjacent side walls 5. The skilled reader will understand that the grip portion 2 therefore comprises a planar region which may be gripped by a user, with a raised side wall that helps prevent the user's fingers from slipping sideways off the grip portion 2, and also helps to prevent the user from gripping the sample portion 3 of the cuvette 1.

In preferred embodiments one or both major surfaces of the grip portion 2 may be roughened or otherwise textured to improve the ease with which the grip portion 2 may be gripped by a user.

In preferred embodiments the depth of the planar part of the grip portion 2 may be around 2.5 mm, and the total height of the edge wall of the grip portion 2 (extending in both directions away from the plane of the grip portion 2) may be around 4 mm.

As described above, the sample portion 3 of the cuvette 1 is attached to the grip portion 2 or formed integrally therewith, and extends away from the grip portion 2. In this example, the sample portion 3 extends away from one of the longer sides 4 of the rectangular shape of the grip portion 2. However, this need not be the case, and the sample portion 3 may extend from any suitable part of the grip portion 2. It should be understood that the grip portion 2 may also take any other suitable shape (for instance, oval or circular).

In the example shown, the sample portion 3 takes the form of a generally planar projection, lying in the same or substantially the same plane as the grip portion 2, and having opposing major surfaces 6, 7. The opposing major surfaces 6, 7 are, preferably, parallel with one another, and of the same shape.

The depth of the sample portion 3 may be around 2-3 mm. The sample portion 3 may extend away from the grip portion 2 by around 11-12 mm.

In this example, the sample portion 3 has a generally triangular shape, with the base 8 of the triangle located where the sample portion 3 meets the grip portion 2, tapering towards an apex 9 which is the furthest point of the sample portion 3 from the grip portion 2.

The sample portion 3 has a sample chamber 10 formed therein.

The sample chamber 10 comprises two sub-chambers. A first chamber 11 is formed at or near the apex 9 of the sample portion 3, and is in communication with an opening 12 (best seen in FIG. 3) which is formed at the apex 9 of the sample portion 3. The opening 12 comprises a gap formed at the apex 9 of the sample portion 3, between the major surfaces 6, 7 thereof. Preferably, the depth of the opening 12 is approximately 0.8 mm The gap which forms the opening 12 extends around the apex 9 of the sample portion 3, and takes the form of an elongate slot, lying in or substantially in the plane of the sample portion 3. The opening 12 has a width of around 3.5 mm.

Because the opening 12 extends around the apex 9 of the sample portion 3, the regions of the sample portion 3 above and below the opening 12 form protruding, spaced-apart lips (also best seen in FIG. 3), which are presented at the apex 9.

The internal side walls 13 of the first chamber 11 meet the edges of the opening 12, and taper inwardly, towards one another, in the direction passing from the apex 9 of the sample portion 3 towards the base 8 thereof. Preferably, in this tapering portion, the internal side walls 13 are generally straight. The internal side walls 13 taper towards a junction 14. The internal side walls 13 then extend from the junction 14 parallel or substantially parallel to one another in a direction which is generally straight towards the base 8 of the sample portion 3. The regions over which the internal side walls 13 are generally parallel define a second chamber 15. The second chamber 15 terminates, at its end closest to the grip portion 2, in a generally flat internal end wall 16. The second chamber 15 is closed at the end nearest the grip portion 2, and can communicate with the exterior of the cuvette 1 only through the first chamber 11.

Although the above discussion refers to a junction 14 where the first chamber 11 meets the second chamber 15, there is no barrier, filter or other obstruction between the two chambers 11, 15, and the two chambers 11, 15 communicate with one another to form a single internal space of the sample chamber 10.

In preferred embodiments the depth of the sample chamber 10, throughout the first and second chambers 11, 15, is constant or substantially constant. The sample chamber 10 has front and rear walls 17, 18 which are parallel or substantially parallel with the major surfaces 6, 7 of the sample portion 3. These front and rear walls 17, 18 are preferably flat and planar, and also parallel with each other.

The side walls 13 of the sample chamber 10 are preferably at right angles to the front and rear walls 17, 18, and give the sample chamber 10 its shape.

In preferred embodiments, the volume of the second chamber 15 is greater than the volume of the first chamber 11. More preferably the volume of the first chamber 11 may be between 70 and 95% of the volume of the second chamber 15. Yet more preferably, the volume of the first chamber 11 may be around 90% of the volume of the second chamber 15.

In alternative embodiments, the volume of the second chamber 15 is less than the volume of the first chamber 11.

The shapes of the first and second sample chambers 11, 15 are preferably different, even though their volumes are similar. The first sample chamber 11 is preferably wider than the second sample chamber 15. The first sample chamber 11 preferably has a width, at its widest part, which is at least 1.5 times as wide as the widest part of the second sample chamber 15. Yet more preferably, the first sample chamber 11 preferably has a width, at its widest part, which is at least twice as wide as the widest part of the second sample chamber 15.

Use of the cuvette 1 will now be described. With reference firstly to FIG. 4a, a cuvette 1 as described above is advanced towards a drop or other quantity of blood 21, which (in the example shown) is present on a surface 22. The surface 22 may, in practice, be the skin of an individual, and the drop of blood 21 may be present on the skin because the user (or another person, such as a medical professional) has administered a prick to the skin to draw the drop of blood 21 out.

The cuvette 1 is advanced towards the blood 21 with the apex 9 of the sample portion 3 forward-most.

When the apex 9 of the cuvette 1 touches the surface of the drop of blood 21, some of the blood 21 is drawn into the first chamber 11 by capillary action, as will be understood by the skilled reader. The presence of the protruding lips, formed by the opening (as described above) will assist in producing this capillary action and allowing air to escape from the first chamber as it is replaced by blood. The blood 21 is drawn only into the first chamber 11, approximately as far as the junction 14, and is not drawn into the second chamber 15. The blood is unable to be drawn into the second chamber 15 as the capillary action drawing the sample into the second chamber 15 is unable to overcome the capillary action holding the sample in the first chamber 11 and force the air trapped in the second chamber 15 to escape through the blood sample in the first chamber 11.

The cuvette 1 is then withdrawn from the blood 21, and placed into a centrifuge, as shown in FIG. 4c (the action of the centrifuge is shown schematically by the arrow 23). The cuvette 1 is loaded into the centrifuge so that the apex 9 of the sample portion 3 points directly or substantially directly towards the axis 24 about which the cuvette 1 will rotate. The grip portion 2 of the cuvette 1 is furthest from this axis of rotation 24.

The centrifuge is then activated, and the cuvette 1 rotates rapidly around the axis of rotation 24. The rate of rotation may, for instance, be around 5,000 rpm and the direction of rotation can occur in either way around the axis of rotation. The skilled person will understand that, as a result of this, a force (indicated by an arrow 25 in FIG. 4c) will act on the blood 21, tending to force the blood 21 away from the axis of rotation 24.

As a result of this, sufficient force is applied to allow the blood 21 to flow outwardly away from the axis of rotation 24, and pass from the first chamber 11 into the second chamber 15. As this occurs the air that was previously in the second chamber 15 will flow in the other direction, into the first chamber 11.

When the cuvette 1 starts to rotate within the centrifuge, the blood 21 is initially held only within the first chamber 11, as discussed above. The angles of the side walls 13 of the first chamber 11 are set so that, as the centrifugation begins, the blood 21 held in the first chamber will flow into the second chamber 15, and will not flow over the top edges of the side walls 13 and out of the sample chamber 10 to the exterior of the cuvette 1. In the example shown in FIG. 1, the angle of each of the side walls 13, with respect to the central axis of the sample chamber 10 (i.e. relative to a straight line passing from the tip of the apex 9, through the middle of the sample chamber 10 towards the grip portion 2), is no more than around 25°, and is preferably 25° or around 25°.

Notwithstanding the above, it is also envisaged that the angle of each of the side walls 13 with respect to the central axis of the chamber 10 may be greater than 25°, and indeed may be of such an angle that some blood may spill out of the first chamber 11 during the centrifuging process. While this is not preferred, it is anticipated that this may not affect the accuracy of analysis carried out using the cuvette 1.

As discussed above, the volume of the second chamber 15 is preferably greater than that of the first chamber 11. The blood 21 that was initially held in the first chamber 11 will, therefore, all fit into the second chamber 15. Preferably (as discussed above) the volume of the second chamber 15 is only slightly greater than that of the first chamber 11, so that the blood 21 almost fills the second chamber 15, thereby making maximum use of the available space within the second chamber 15 for analysis purposes.

However, in other embodiments the volume of the second chamber 15 is less than that of the first chamber. It may, in these embodiments, be possible to achieve greater resolution in analysing the blood held within the second chamber during centrifugation. For instance, if the analysis is to determine the proportion of red blood cells within the blood sample, it may be the case that, in practice, the red blood cells will comprise a maximum of around 50% of the volume of the blood sample. In this case, the volume of the second chamber 15 may be, for example, around 70% of the volume of the first chamber 11.

During centrifugation, the sample will flow into the second chamber 15, but only 70% (in this example) will fit into the second chamber 15, with the remaining 30% staying at the bottom end of the first chamber 11 (i.e. the end closest to the junction 14). This 30% will not include any red blood cells, and is therefore effectively redundant for the purposes of measuring the presence of red blood cells. Since the volume of the second chamber 15 can be smaller in these embodiments, the second chamber can (for example) be of the same length as in other embodiments, but be thinner (i.e. have a reduced depth in the direction perpendicular to the plane of the sample portion 3), thereby allowing increased resolution when measuring the quantity of red blood cells in the sample.

As a further possibility, the volume of the second chamber 15 may be the same, or substantially the same, as that of the first chamber 11.

The skilled reader will understand how analysis of the blood 21 within the second chamber 15 may be carried out during the centrifugation process. For instance, one or more light sources may be provided on one side of the cuvette 1, and one or more light sensors may be provided on the other side of the cuvette 1. As the cuvette 1 rotates, a processor may analyse signals received from the light sensors to produce information as to how much of the light produced by the light sources is absorbed by the blood 21 within the second chamber 15. Alternatively, or in addition, one or more light sensors are provided on the same side of the cuvette 1 as the light source(s), and the amount of the incident light that is reflected from the sample held within the second chamber 15 may be measured. The details of analysis of blood within a centrifuge are known per se and will not be discussed in detail here.

It will be appreciated that the cuvette 1 discussed above displays a number of advantages with respect to conventional cuvettes.

Firstly, the cuvette is simple to manufacture. The cuvette 1 is designed so that it may be produced in a simple moulding process, and can be formed as a unitary piece of plastic (or another material). It should particularly be noted that, passing in the direction from the apex 9 of the sample portion 3 towards the base 8 thereof, the width of the sample chamber 10 either decreases or remains constant. This ensures that the sample chamber 10 can be moulded easily, i.e. by being formed around an insert which is included in the mould, and the cuvette 1 can then be pulled easily off this insert once the moulding process is complete. It will be understood that, if the width of the sample chamber increased in the direction passing from the apex 9 of the sample portion 3 to the base 8 thereof, it would not be possible to mould the cuvette 1 simply in this manner.

In addition to this, passing from the apex 9 towards the base 8. the overall external shape or envelope of the sample portion 3 increases, or remains the same, at all points. This will also (as the skilled reader will understand) assist with the moulding process.

The shape of the sample chamber 10 is also particularly advantageous. The first chamber 11 is relatively short and wide, thus encouraging the flow of blood into the first chamber 11 through capillary action and the egress of air from it. The second chamber 15 is, by contrast, long and thin, thus allowing accurate and repeatable analysis. For instance, as discussed above a medical professional may wish to analyse the concentration of red blood cells in a sample of blood. During the centrifugation process, the red blood cells will (being the heaviest component of the blood) gather at the closed end 16 of the second chamber 15. The "depth" of the layer of red blood cells at the closed end 16 will indicate the proportion of red blood cells in the sample. Since the second chamber 15 is relatively long and thin, and of a constant width, this allows an accurate, high-resolution analysis of this property of the blood being sampled.

It is envisaged that embodiments of the present invention may be produced cheaply and in large quantities, and supplied in individual sterile or substantially sterile packages for convenient use with a hand-held centrifuge/analyser.

Turning to FIGS. 5*a* to 5*d*, further potential shapes of the sample chamber 10 are shown. For easy comparison, the shape of a sample chamber 10 as discussed above in relation to FIGS. 1 to 3 is shown in FIG. 5*a*.

Figure 5B:
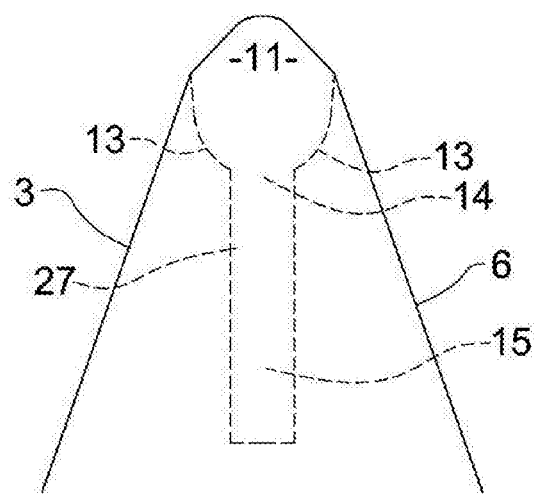
FIGS. 5b to 5d and 6 to 9 show alternative sample portions for a cuvette embodying the present invention.

FIG. 5*b* shows an alternative sample chamber 27, in which the side walls 13 of the first chamber 11 are curved outwardly (with respect to a central axis of the sample chamber 27) as they pass from the junction 14 to meet the external side walls of the triangular shape 6 of the sample portion 3.

Figure 5C:
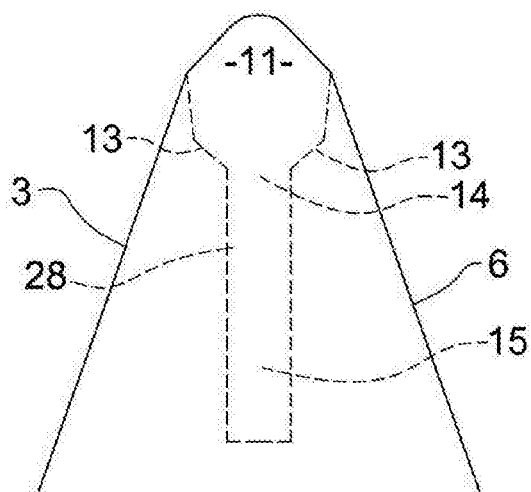

Turning to FIG. 5*c*, a further sample chamber 28 is shown. In this variant, the side walls 13 of the first chamber 19 flare outwardly from the junction 14, and turn through a sharp angle before extending at a shallower angle, with respect to the central axis of the sample chamber 28, before meeting the external side walls of the triangular shape 6 of the sample portion 3.

Figure 5D:
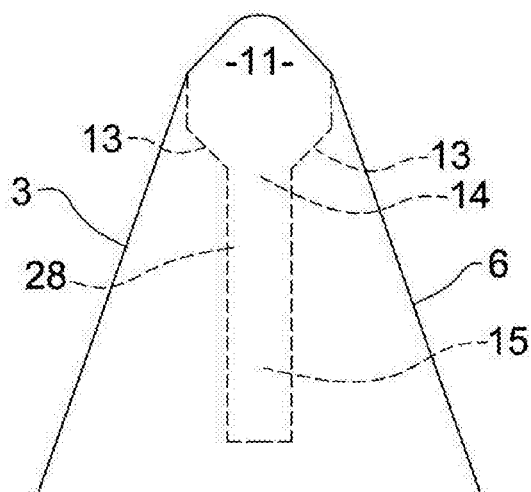

Finally, FIG. 5*d* shows a further variant of a sample chamber 29, in which the side walls 13 of the sample chamber 15 flare outwards at a greater angle (compared to the example shown in FIG. 5*c*), with respect to the central axis of the sample chamber 29, from the junction 14. The side walls 13 then turn through a sharp angle before extending to meet the side wall 6 of the sample portion 3 in a direction which is substantially parallel with the central axis of the sample portion 29.

In the three variants shown in FIGS. 5*b*, 5*c* and 5*d* the shape of the second chamber 15 is identical or substantially identical to that shown in FIG. 5*a*.

The skilled reader will understand that each of the alternative design shown in FIGS. 5*b*, 5*c* and 5*d* would also confer the same benefits discussed above in relation to the design shown in FIGS. 1 to 3 and 5*a*.

In the designs shown in FIGS. 5*b*, 5*c* and 5*d*, it will be understood that the angle at which the side walls 13 of the first chamber 11 meet the opening 12 is reduced, with respect to the central axis of the sample chamber 10, with respect to the design shown in FIG. 5*a*. As discussed above, when centrifugation of the cuvette 1 begins, there is a risk that blood 21 held in the first chamber 11 will leak out of the sides of the opening 12, rather than flowing into the second chamber 15. The designs shown in FIGS. 5*b*, 5*c* and 5*d* help ensure that leakage of blood 21 during centrifugation is even less likely.

FIGS. 6-9 show further alternative shapes for the second chamber 15. In each of FIGS. 6-9, the overall shape of the sample portion 3, and of the first chamber 11 and opening 12 are the same or substantially the same as shown in FIG. 1.

Figure 6:
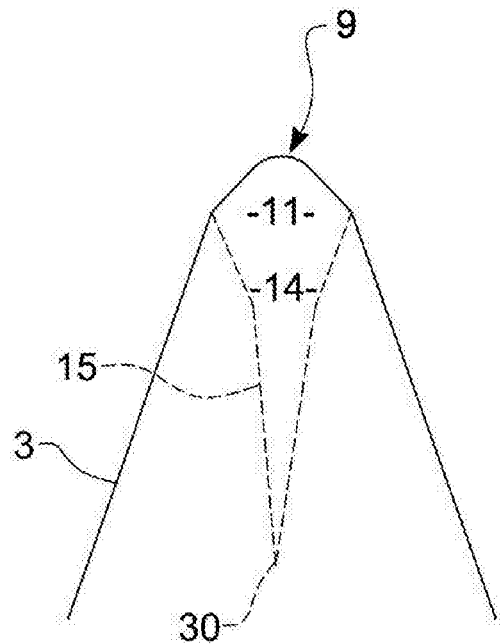

In FIG. 6, the second chamber 15 tapers constantly from the junction 14 to a point 30, rather than being of constant width. One advantage of this design is that, if the concentration of red blood cells or another component in the blood under analysis is low, the quantity of red blood cells that accumulate at the closed end of the second chamber 15 will be easier to determine.

Figure 7:
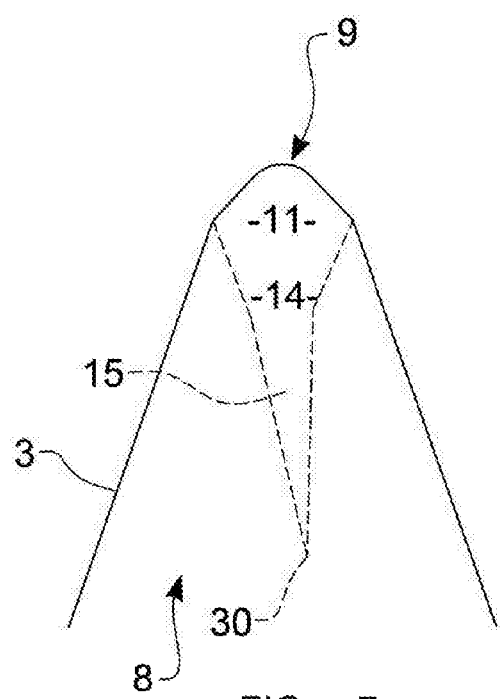

FIG. 7 shows a further alternative, which is similar to the design shown in FIG. 6. However, in this design the second chamber 15 tapers from the junction 14 to a point 31 which is off-set with respect to a straight line joining the centre of the base 8 of the sample portion 3 and the apex 9 thereof. In other words, the point 31 is closer to one side of the triangular shape of the sample portion 3 than to the other side.

Figure 8:
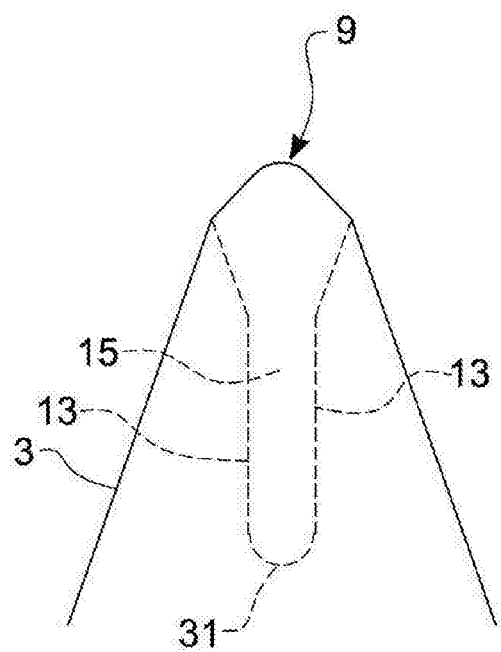

FIG. 8 shows a further alternative where the second chamber 15 has generally parallel side walls 13, but has a rounded end 32, instead of the flat end 16 shown in FIG. 1.

Figure 9:
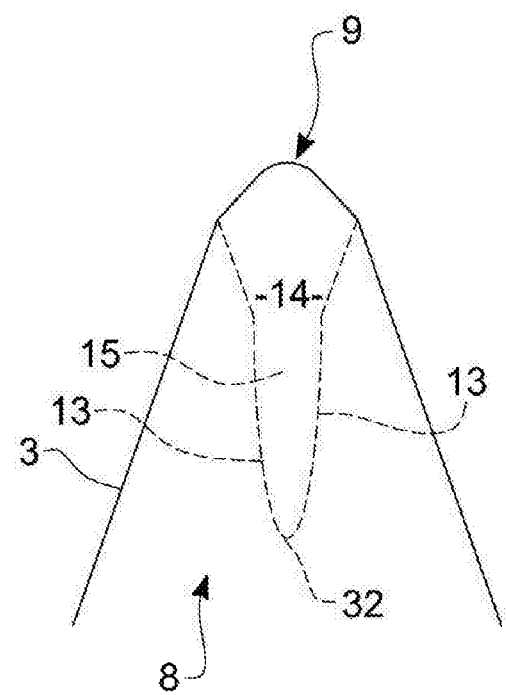

Finally, FIG. 9 shows a further variant in which the second chamber 15 generally takes the form of one-half of an elongate oval, with the side walls 13 curving inwardly towards one another as they extend from the junction towards the base 8 of the sample portion 3, and the second chamber 15 has a curved closed end 13, instead of the flat closed end 16 shown in FIG. 1.

In the examples shown above, the overall shape of the sample portion 3 is triangular, with a relatively wide base 8, tapering towards the apex 9. This is preferred, as it will allow a high degree of mechanical strength for the sample portion 3. However, a shape of this kind is not essential, and the sample portion 3 could, for instance, take the form of a relatively narrow protrusion having a width which is only slightly wider than the widest part of the sample chamber 10.

It will be understood that cuvettes embodying the present invention may be robust, practical and reliable, as well as being simple to manufacture.

The discussion above mentions the analysis of blood. However, cuvettes embodying the present invention may equally be used for analysing other fluids, such as oil from engines or other machines, chemicals on a production line, or rainwater.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A cuvette comprising:
   a main body having a sample chamber formed therein;
   an opening formed in an exterior of the main body, wherein the sample chamber communicates with the exterior of the cuvette by the opening,
   wherein the sample chamber comprises a first sample chamber and a second sample chamber, the first sample chamber being in fluid communication with the opening, and the second sample chamber having a first end which is in fluid communication with the first sample chamber, and a second, closed end, the second sample chamber being in fluid communication with the exterior of the cuvette only through the first chamber, the first chamber having a width which is greater than that of the second chamber, and the volume of the second chamber being greater than or equal to the volume of the first chamber,
   and further wherein the greatest width of the opening is greater than or equal to the greatest width of the first sample chamber, the greatest width of the first sample chamber is greater than or equal to the greatest width of the second sample chamber, and the width of the sample chamber, passing from the opening to the closed end of the second chamber, either remains constant or decreases at each point along its length.

2. The cuvette according to claim 1, wherein the volume of the first chamber is between 75 and 95% of the volume of the second chamber.

3. The cuvette according to claim 1, wherein the volume of the first chamber is around 90% of the volume of the second chamber.

4. The cuvette according to claim 1, wherein the width of the first chamber tapers from the opening toward a junction between the first chamber and the second chamber.

5. The cuvette according to claim 1, wherein the width of the second sample chamber is substantially constant, along its length.

6. The cuvette according to claim 1 wherein the depth of the sample chamber is substantially constant over its area.

7. The cuvette according to claim 1, wherein the closed end of the second chamber is substantially flat.

8. The cuvette according to claim 1, wherein the closed end of the second chamber is curved in shape.

9. The cuvette according to claim 1, further comprising a grip portion which, in use, is adapted to be gripped by a user.

10. The cuvette according to claim 9, wherein the sample chamber is formed within a sample portion which is attached to, or formed integrally with, the grip portion to form the main body of the cuvette.

11. The cuvette according to claim 10, wherein the opening is formed at an apex of the sample portion, and extends around at least a part of the apex so that the sample portion forms a pair of protruding, spaced-apart lips on either side of the opening.

12. A method of analysing a fluid, comprising the steps of:
    providing a cuvette according to claim 1;
    touching an opening of the cuvette on the fluid, so that the fluid is drawn into the sample chamber;
    placing the cuvette in a centrifuge having an axis of rotation about which the cuvette rotates, the cuvette being placed in the centrifuge so that the first sample chamber is closer to the access of rotation than the second sample chamber;
    rotating the cuvette within the centrifuge so that a force is exerted on the fluid sample in a direction away from the axis of rotation, causing the fluid sample to move from the first sample chamber to the second sample chamber; and
    analysing at least one property of the fluid when the fluid is in the second sample chamber.

13. The method according to claim 12, wherein when the fluid is drawn into the first sample chamber, the fluid is not also drawn into the second sample chamber.

14. The method according to claim 12, wherein the fluid is drawn into the first sample chamber through capillary action.

15. The method according to claim 12, wherein the step of analysing the fluid within the second sample chamber comprises providing at least one source of radiation on one side of the cuvette, and at least one radiation sensor on the other side of the cuvette, and analysing the extent to which the radiation emitted by the at least one radiation source is transmitted through the fluid held in the second chamber.

16. The method according to claim 12, wherein the step of analysing the fluid within the second sample chamber comprises providing at least one source of radiation on one side of the cuvette, and at least one radiation sensor on the same side of the cuvette, and analysing the extent to which the radiation emitted by the at least one radiation source is reflected by the fluid held in the second chamber.

* * * * *